July 18, 1933.  A. W. ALLEN  1,918,234

MATERIAL MIXING MACHINE

Filed June 18, 1931  5 Sheets-Sheet 1

INVENTOR.
ARTHUR W. ALLEN
BY
M. Talbert Dick
ATTORNEY.

July 18, 1933.  A. W. ALLEN  1,918,234
MATERIAL MIXING MACHINE
Filed June 18, 1931   5 Sheets-Sheet 2
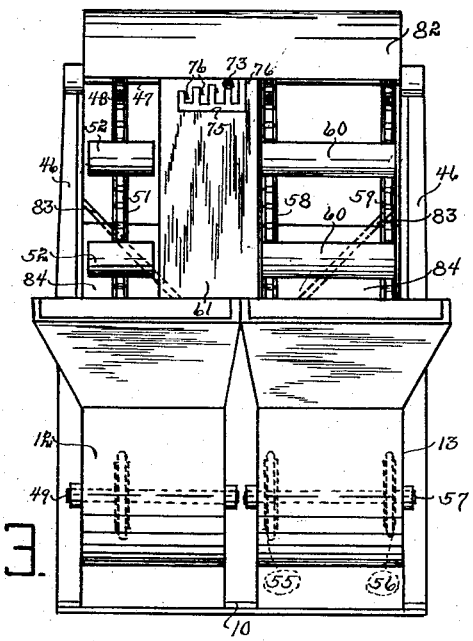
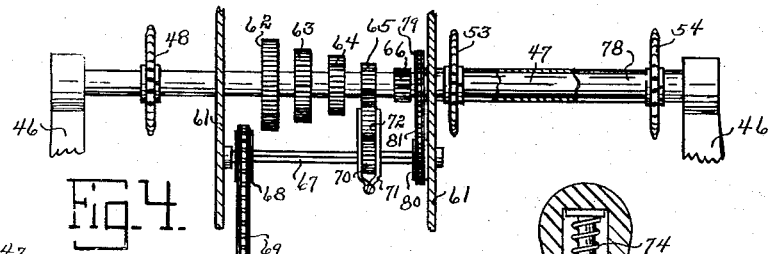
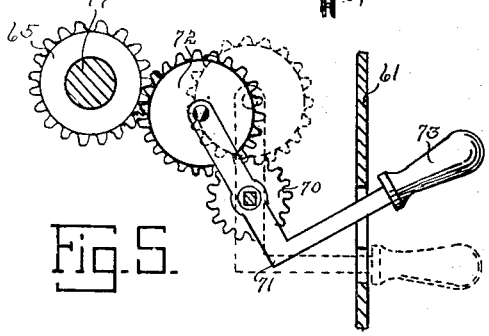
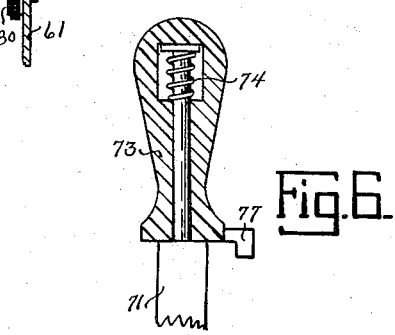
INVENTOR.
ARTHUR W. ALLEN
BY
M. Talbert Dick
ATTORNEY.

July 18, 1933.  A. W. ALLEN  1,918,234
MATERIAL MIXING MACHINE
Filed June 18, 1931   5 Sheets-Sheet 3
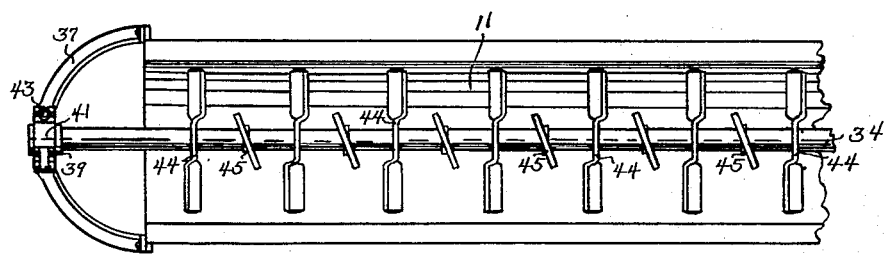
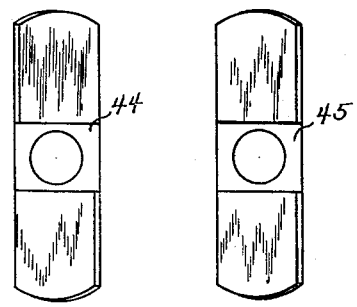
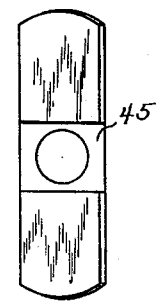
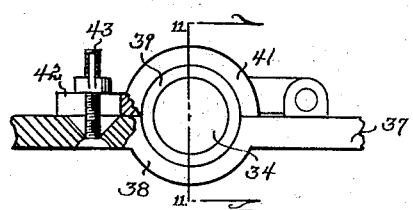
Fig.8.  Fig.9.
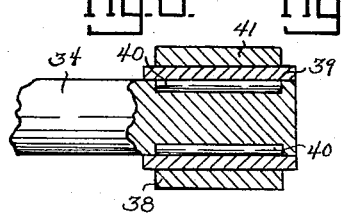
Fig.11.
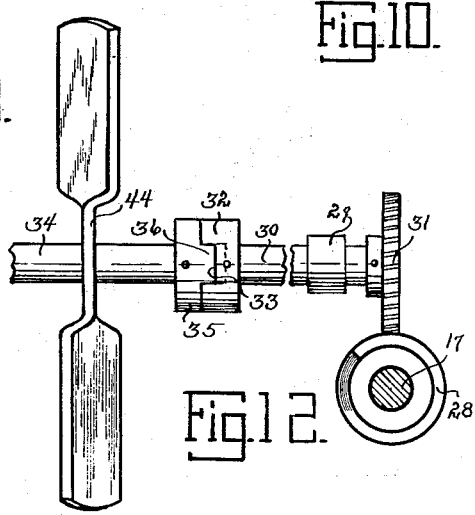
Fig.12.
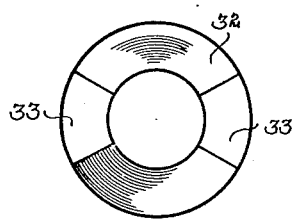
Fig.13.
INVENTOR.
ARTHUR W. ALLEN
BY
M. Talbert
ATTORNEY.

July 18, 1933.  A. W. ALLEN  1,918,234
MATERIAL MIXING MACHINE
Filed June 18, 1931  5 Sheets-Sheet 4

INVENTOR.
ARTHUR W. ALLEN
BY
M. Talbert Dick
ATTORNEY

July 18, 1933.  A. W. ALLEN  1,918,234
MATERIAL MIXING MACHINE
Filed June 18, 1931   5 Sheets-Sheet 5

INVENTOR.
ARTHUR W. ALLEN
BY
M. Talbert Dick
ATTORNEY.

Patented July 18, 1933

1,918,234

UNITED STATES PATENT OFFICE

ARTHUR W. ALLEN, OF DES MOINES, IOWA

MATERIAL MIXING MACHINE

Application filed June 18, 1931. Serial No. 545,217.

The principal object of this invention is to provide a machine for quickly and efficiently mixing materials such as mortar, concrete or other plastic or semi-fluid materials or compounds.

A further object of my invention is to provide a machine for the mixing of materials that may be quickly, easily and accurately adjusted to use different relative amounts of the materials being mixed.

A still further object of this invention is to provide a material mixing machine that is capable of being operated and under the control of a single workman.

A still further object of my invention is to provide a machine for the mixing of materials that delivers a continuous uniform flow of mixed materials as distinguished from the mixing and delivering of materials in a batch, commonly known as batch mixers.

A still further object of this invention is to provide a mixing machine that is capable of having its propeller shaft and propeller blades quickly and easily removed in a unit for cleaning purposes.

A still further object of my invention is to provide a material mixing machine that is economical in manufacture and durable in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawings, in which:

Fig. 3 is a rear end view of the material mixing machine.

Fig. 4 is a plan view of a selective gear assembly used for obtaining various relative speeds of the bucket carrying chains.

Fig. 5 is a side view of the manual means for controlling the selective gear assembly shown in Fig. 4.

Fig. 6 is a side sectional view of the handle member and catch member used in the construction shown in Fig. 5.

Fig. 7 is a top plan view of a portion of the elongated mixing trough and assembly.

Fig. 8 is a front view of one of the propeller blades used for mixing the material and having a double directional pitch.

Fig. 9 is a front view of one of the propeller blades having both of its oppositely extending blades of the same directional pitch.

Fig. 10 is an end sectional view of the split bearing and assembly for rotatably holding the forward end of the propeller shaft.

Fig. 11 is a side sectional view of the forward end portion of the propeller shaft rotatably mounted in its bearing and taken on line 11—11 of Fig. 10.

Fig. 12 is a side view of the rear end portion of the propeller shaft mounted for rotation and operatively connected to driving gears.

Fig. 13 is a front end view of the cup member for receiving the rear end of the propeller shaft.

The chief objections to material mixing machines now being used by the general public are that they are very slow in the mixing of the materials and do not give a continuous uniform out-put. Furthermore, they are not readily adaptable to the mixing of various kinds of materials. I have overcome such disadvantages as will hereinafter be appreciated.

Figure 1:
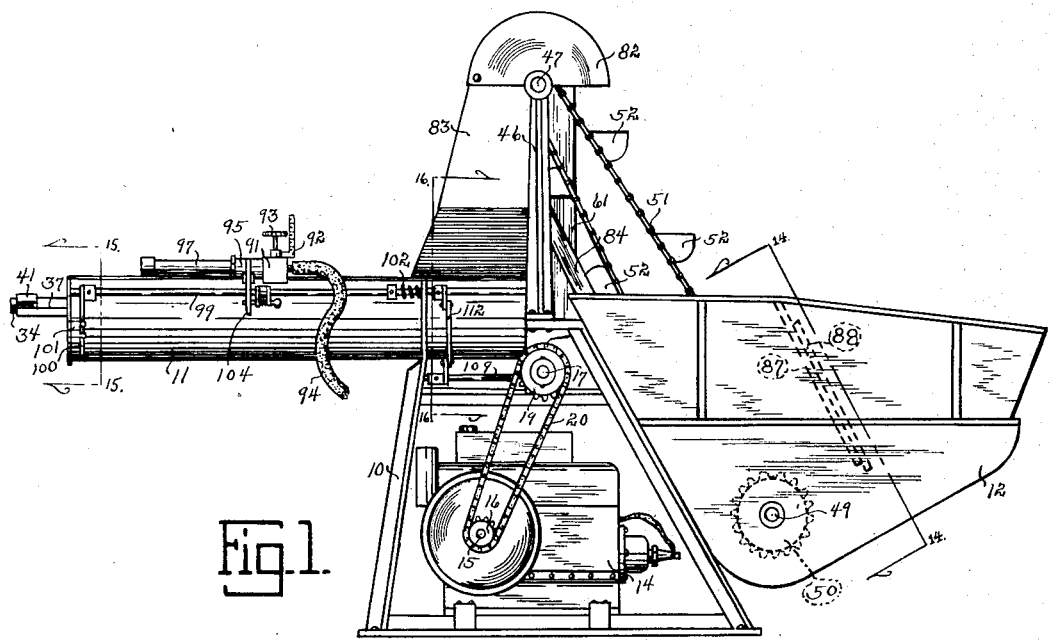
Fig. 1 is a left side view of my complete invention ready for use.
Figure 2:
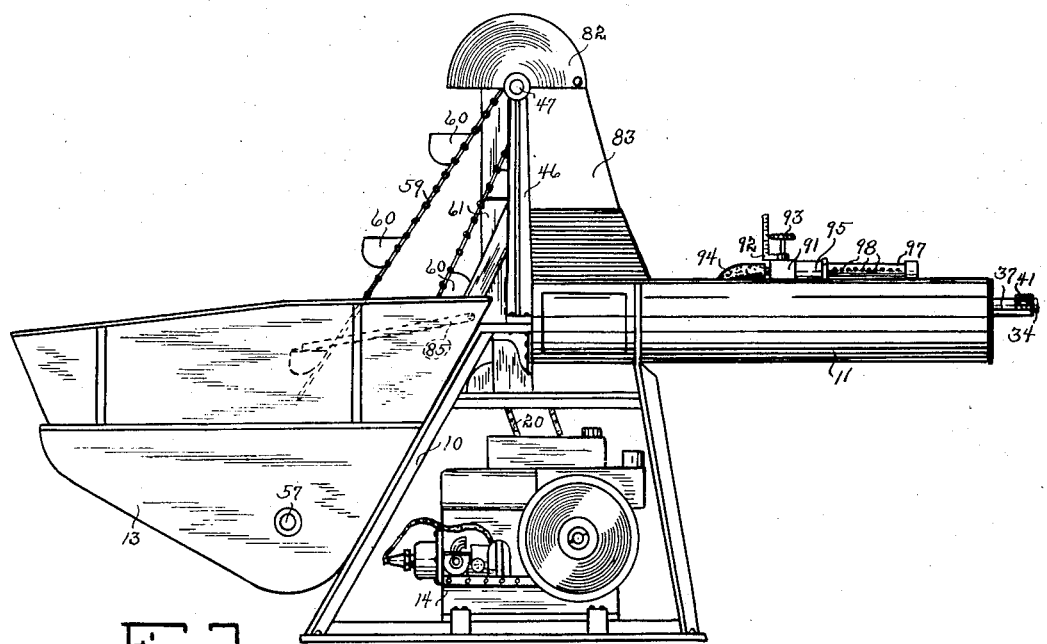
Fig. 2 is a right side view of my mixing machine.
Figure 14:
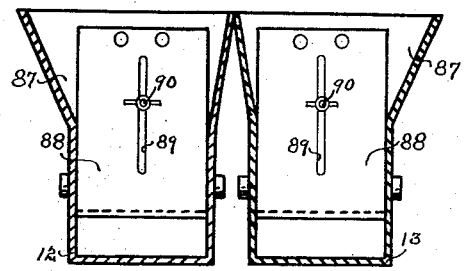
Fig. 14 is a rear end sectional view of the two material hoppers of the invention and is taken on line 14—14 of Fig. 1.

Referring to the drawings, I have generally designated the base portion of the frame of the invention by the numeral 10. Secured to the upper portion of this frame and extending laterally therefrom, as shown in Fig. 1, is my horizontally positioned mixing trough 11. This trough is open at its top and forward end and has a rounded bottom throughout its length. Secured by a suitable means to the other side of the frame 10 from the trough 11 are two supply hoppers open at their tops, which I have designated by the numerals 12 and 13. The number of these supply hoppers employed will correspond with the number of dry materials being mixed. Although in my drawings I show only two hoppers, any number of hoppers desired may be used. The numeral 14 designates a prime mover such as an internal combustion engine secured to the base of the frame 10, as shown in Fig. 1 and Fig. 2. This prime mover has the usual drive shaft 15 rigidly secured upon which are the comparatively small sprocket wheels 16. The numeral 17 designates the main drive shaft of the invention horizontally mounted in the bearing members 18, which are in turn secured to the frame 10. This shaft 17 extends between the trough 11 and supply hoppers 12 and 13 and is arranged transversely of the longitudinal axis of the trough 11.

Figure 21:
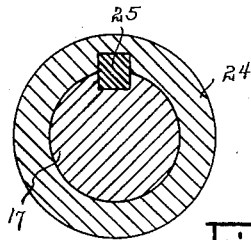
Fig. 21 is an enlarged cross sectional view of a shaft and keyed sleeve, taken on line 21—21 of Fig. 20.
Figure 22:
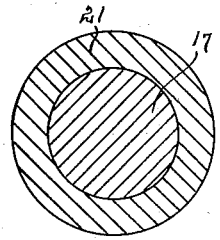
Fig. 22 is an enlarged cross sectional view of a shaft and collar taken on line 22—22 of Fig. 20.
Figure 24:
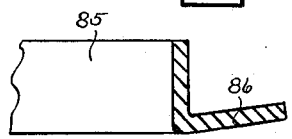
Fig. 24 is an enlarged cross sectional view of the scraping bar, taken on line 24—24 of Fig. 19.
Figure 23:
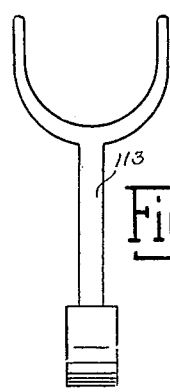
Fig. 23 is an enlarged side view of the operating fork shown in Fig. 20.

The numeral 19 designates a comparatively large sprocket wheel rigidly secured on the left end portion of the shaft 17. The numeral 20 designates an endless chain embracing the sprocket wheels 16 and 19 respectively. By this arrangement, when the prime mover 14 is running, the shaft 17 will be rotated to the right thereby. I have used the numeral 21 to designate a collar loosely and rotatably mounted on the shaft 17. Rigidly secured near the center of this collar and embracing the same is a large sprocket wheel 22. The numeral 23 designates a clutch plate rigidly secured on the left end of the collar 21. I have used the numeral 24 to designate a sleeve slidably mounted on the shaft 17, but prevented from independent rotation by a key 25, as shown in Fig. 21. The numeral 26 designates a spool member rigidly secured on the left end portion of the sleeve 24. The numeral 27 designates a second clutch plate rigidly secured to the right end of the sleeve 24 and capable of engaging the clutch plate 23 when the sleeve 24 is moved to the left on the shaft 17. The numeral 28 designates an elongated worm gear loosely mounted on the shaft 17, but rigidly secured to the left end portion of the collar 21. By this arrangement of parts, when the clutch plate 27 is engaging the clutch plate 23 and the prime mover is running, the sprocket wheel 22 and the worm gear 28 will be rotated. By moving the sleeve 24 to the left the clutch plate 27 will withdraw from engagement with the clutch plate 23 and the sprocket wheel 22 and worm gear 28 will cease to rotate although the main drive shaft 17 continues to rotate.

The numeral 29 designates a bearing member secured by any suitable means to the frame 10. This bearing member extends longitudinally of the trough 11 and is positioned in the rear of the same. The numeral 30 designates a shaft rotatably mounted in the bearing member 29. The numeral 31 designates a worm wheel rigidly secured on the rear end of the shaft 30 and in engagement with the worm gear 28. The numeral 32 designates a cup member rigidly secured on the front end of the shaft 30. In the rim of this cup member 32 are notches 33, as shown in Fig. 13. The numeral 34 designates the detachable propeller shaft normally designed to have its rear end portion entering and engaging the cup member 32, as shown by dotted lines in Fig. 12. The numeral 35 designates a collar rigidly secured on the rear end portion of the shaft 34. This collar 35 has rearwardly extending lugs 36 on its rear marginal edge capable of entering and engaging the notches 33 in the cup member 32 when the shaft 34 is in normal position in the trough 11. The numeral 37 designates a horizontal U-shaped bracket secured to the forward end of the trough 11. The central portion of the bracket 37 is formed to provide a half bearing member, which I have designated by the numeral 38 and shown in Fig. 10. The numeral 39 designates a roller bearing sleeve embracing the forward end portion of the propeller shaft 34 and roller bearings 40 thereon. This sleeve 39, when the shaft 34 is in a normal operative position, is designed to rest in the member 38. The numeral 41 designates a half bearing member hinged at one side to the bracket 37 and when in a lowered position, forms with the half bearing member 38, a complete bearing member which embraces the roller bearing sleeve 39 and normally holds and supports the same against rotation.

The numeral 42 designates a slotted ear secured to the opposite side of the member 41 from its side that is hinged to the bracket 37. The numeral 43 designates a wing-nutted bolt extending through the bracket 37 and the slot in the ear 42, as shown in Fig. 10. By this arrangement, the bearing member 41 may be rigidly held in a lowered position over the sleeve 39. To remove the propeller shaft 34 from the trough 11 in order to clean or wash it and the blades secured to it, it is merely necessary to loosen the bolt 43, swing the bearing member 41 from above the sleeve 39 and lift the propeller shaft forwardly and upwardly until it is free of the bearing member 38 and the cup member 32. This feature is indeed very necessary, as it is imperative that the shaft and propeller blades be thoroughly washed and cleansed of all clinging material after being used. Rigidly secured by any suitable means on the shaft 34 and spaced apart from each other are the mixing propellers 44 and 45, each comprising two diametrically oppositely extending blades. The propellers 44 are alternated with the propellers 45. The blades of the propellers 44 are so spiraled that the leading edge of each blade is in the rear of the trailing edge of that blade relative to the position of the machine, thereby not only successfully mixing the material in the trough, but causing it to pass from the rear end of the trough toward the forward end of the trough 11. The blades of the propellers 45 are constructed somewhat differently, in that one of their blades has its leading edge to the rear of its trailing edge and its other blade has its leading edge forward of its trailing edge, relative to the position of the machine, thereby one of the blades of each of the propellers 45 will cause the material to pass toward the forward end of the trough, but the other blade will whip the material toward the rear of the trough.

By this arrangement, the material to be mixed will be thrown forth and back in the trough and thoroughly mixed, but due to the fact that a greater number of the blades are bent so as to throw the material to the forward end of the trough, the same will eventually reach the forward end of the trough in a homogeneous or thoroughly mixed mass. The numeral 46 designates upwardly extending supporting posts secured to the top of the frame 10. The numeral 47 designates a rotatably mounted shaft in the posts 46. This shaft 47 is positioned above the rear end of the trough 11 and extends transversely of the longitudinal length of the trough 11. The numeral 48 designates a sprocket wheel rigidly secured on the shaft 47 and positioned near the left end of that shaft. Rotatably mounted in the hopper 12 is a shaft 49 rigidly carrying the sprocket wheel 50. Embracing the sprocket wheels 48 and 50 is an endless chain 51. Secured on the outer side of this chain 51 and evenly spaced apart are the usual carrying buckets 52. The numerals 53 and 54 designate two spaced apart sprocket wheels rigidly secured on a sleeve 78 rotatably mounted on the right end portion of the shaft 47. The numerals 55 and 56 designate two sprocket gears rigidly secured on the shaft 57 rotatably mounted in the hopper 13. Embracing the sprocket wheels 53 and 55 is an endless chain 58. The numeral 59 designates a similar endless chain embracing the sprocket wheels 54 and 56. The numeral 60 designates spaced apart carrying buckets secured to and extending between the chains 58 and 59. Extending upwardly from the frame 10 and embracing the central portion of the shaft 47 is a housing 61. The numerals 62, 63, 64, 65, and 66 designate spur gears rigidly secured on the shaft 47 and inside the housing 61. These spur gears are spaced apart and decrease in diameter sizes from each other as they progress to the right, as shown in Fig. 4.

The numeral 67 designates a shaft rotatably mounted in the housing 61, spaced apart from and parallel with the shaft 47. This shaft 67 has its length of square cross sectional construction except at its two ends which are rotatably mounted in suitable bearing members secured to the housing 61. Rigidly secured on the left end portion of the shaft 67 is a sprocket wheel 68. The numeral 69 designates an endless chain embracing the sprocket wheels 22 and 68. The numeral 70 designates a spur gear slidably mounted on the shaft 67. Loosely engaging each side of the gear 70 to facilitate the manual sliding of the same on the shaft 67, is a bracket member 71. Rotatably mounted in the forward end of the bracket member 71 is a spur gear 72. This spur gear 72 is in mesh with the spur gear 70 and is capable of also being moved to a position in engagement with any one of the spur gears 62, 63, 64, 65, and 66. The numeral 73 designates a handle member slidably mounted on the rear end portion of the bracket member 71. This handle member 73 is yieldingly held in a forward position of its sliding movement on the member 71 by the coil spring 74, as shown in Fig. 6. This handle member 73 is positioned outside of the housing 61, as the rear end portion of the bracket 71 extends through an opening 75 in the rear side of the housing 61. This opening 75 is in the form of a horizontal slot with communicating vertical slots parallel with each of the spur gears 62, 63, 64, 65, and 66. By such an arrangement, the rear end portion of the bracket 71 may be slid horizontally to any given position parallel with the spur gears 62, 63, 64, 65, and 66 and then moved upwardly in a corresponding vertical slot by manually grasping the handle 73. Naturally, the idler spur gear 72 will be in mesh with the spur gear on the shaft 47 parallel with the vertical slot in which the rear end portion of the bracket 71 resides and that gear will thereby be operatively connected to the shaft 67.

In order to hold the idler gear 72 in mesh with one of the gears on the shaft 47, I have provided small notches 76 adjacent the side marginal edge of each of the vertical slots of the opening 75, and into which a lug 77 on the handle member 73 may enter. To release the lug 77 from its retaining notch it is merely necessary to manually pull the handle portion 73 outwardly against the spring 74 until the lug 77 has become disengaged with the notch. With the lug 77 free of its retaining notch, the idler 72 may be moved free of mesh with any one of the spur gears on the shaft 47 and it, with its spur gear 70, may be slid either to the right or left on the square shaft 67. Inside the housing 61 and rigidly secured on the sleeve 78 is a sprocket wheel 79. The numeral 80 designates a sprocket wheel rigidly secured on the shaft 67. The numeral 81 designates an endless chain embracing the sprocket wheels 79 and 80. By this arrangement of parts, when the sprocket wheel 22 is rotating the sprocket wheels 53 and 54 will be rotating and if the idler spur gear 72 is in mesh with any one of the spur gears 62, 63, 64, 65, or 66, the sprocket wheel 48 will also be rotating. The relative speed of rotation of the sprocket wheel 48 to the sprocket wheels 53 and 54 will be determined by the particular spur gear on the shaft 47 that is in mesh with the spur gear 72. In other words, if the gear 72 is in mesh with the gear 62, the speed of rotation of the sprocket wheel 48 will be comparatively less than if the gear 72 is in mesh with the spur gear 66. By such an arrangement, various speeds of the sprocket wheel 48 relative to the sprocket wheels 53 and 54 may be selectively had. As the rear end portion of the bracket 71 must be moved further upwardly to engage the small spur gears on the shaft 47, the vertical slots of the opening 75 extend higher as they progress to the right, as shown in Fig. 3.

By the above described portion of the invention any desired speed of the chain 51 to the chains 58 and 59 may be selectively had, thereby making it possible for selectively proportioning the amount of material being removed by the carrying buckets from the hopper 12 relative to the amount of material being removed by the carrying buckets from the hopper 13. As the shaft 47 is positioned above the rear end portion of the mixing trough 11, the carrying buckets 52 and 60 will, as they pass over this shaft, deposit their contents in the rear end of the mixing trough where the same will be immediately contacted by the mixing and moving propellers. Suitable shields 82 and 83 may be secured to the vertical posts 46. To catch any loose material dropping from the carrying buckets and their chains and return such material to the hoppers 12 and 13, I have provided a trough member 84 under the chain 51 and under the chains 58 and 59.

Figure 19:
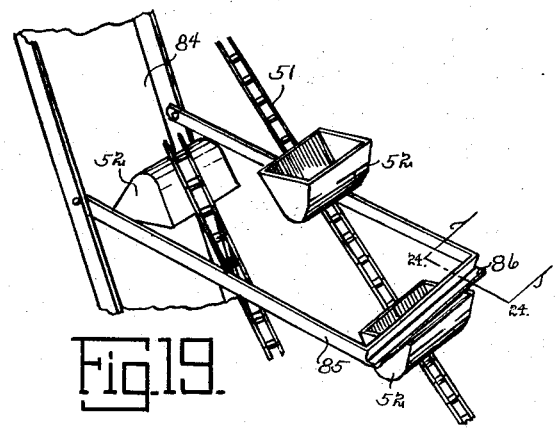
Fig. 19 is a perspective view of the means for scraping surplus material from the top of the material carrying buckets.

These troughs extend from points inside the hoppers upwardly and forwardly to the posts 46, as shown in the drawings. The numeral 85 designates a U-member secured to each of the troughs 84 by having its two ends pivotally secured by bolts, rivets, or the like, as shown in Fig. 19. These U-members loosely and freely embrace the chain holding the buckets 52 and the chains holding the buckets 60 respectively, as shown in the drawings. The numeral 86 designates a rearwardly extending straight flange on the central portion of each of the U-members 85. These U-members are so designed that when they are at their lower swinging movement they will have their central portions resting at and on the forward top of one of the carrying buckets. As the buckets move upwardly, they will carry the U-members also upwardly, but due to the length of the U-members, their central portions will slowly move outwardly across the top of the bucket supporting them, thereby removing all surplus material above the marginal rim of the bucket.

With the continued upward movement of the bucket, the U-member engaging it will eventually pass over its rear marginal edge and will fall by its own weight downwardly to engage the oncoming bucket and again duplicate the procedure. This removing of the surplus material will be facilitated by the cutting and scraping flange 86. In Fig. 19 the U-member has been moved to approximately the center top of one of the carrying buckets. The numeral 87 designates a downwardly and rearwardly extending partition in each of the hoppers. These partitions terminate some distance from the bottom of the hopper in which they are located. Slidably mounted on the rear side of each of these partitions is a gate 88. These gates each have a longitudinal slot 89. Extending through each of the partitions and the slot 89 in the gate adjacent that partition is a wing bolt 90. By the use of these wing nuts the gates 88 may be adjustably secured in any position. Naturally, any material from the hoppers reaching the carrying buckets must pass under these partitions and the gates 88.

The numeral 91 designates a manually operated liquid valve secured on the left marginal side of the trough 11. The numeral 92 designates a vertical gauge extending beside the valve wheel 93, as shown in Fig. 1. As the stem of the valve is moved upwardly or downwardly by rotating the wheel 93, the same will register on the gauge scale 92 at the side of the wheel 93 and will correctly record the degree the valve 91 is opened or closed. The numeral 94 designates a hose having one end communicating with the inlet port of the hand valve 91 and its other end designed to lead to a source of liquid supply of constant pressure. The numeral 95 shows an ordinary manually operated valve, of the self-closing type, shown in conventional form, and communicating with the outlet port of the screw valve 91.

This valve 95 has the valve actuating stem 96, which is yieldingly held outwardly for placing the valve in a closed position, as is well known to all those familiar with such type of valves. The numeral 97 designates a pipe communicating with the outlet port of the valve 95. This pipe 97 has its end closed and extends parallel with and just above the marginal edge of the trough 11, as shown in Fig. 1. The numeral 98 designates a row of openings in the side of the pipe 97 that is adjacent the trough 11.

The numeral 99 designates a rod slidably and rotatably mounted on the left side of the trough 11. This rod 99 is rotatably and slidably functioned by a lever 100 rigidly secured at its upper end to the rod 99. The numeral 101 designates a catch member having notches secured to the side of the trough 11. The coil spring 102 yieldingly holds the rod 99 forwardly and the lever 100 in engagement with any one of the notches of the catch member 101. In order to rotate the rod 99, it is necessary to move the lever 100 to the rear until it is free of the holding notches of the catch member. The numeral 103 designates a projection on the automatically closing valve 95 extending parallel with the valve stem 96. The numeral 104 designates an arm pivoted to the projection 103. This arm has its upper end adjacent the outer end of the valve stem 96 and its other end portion extending to the side of the rod 99. Rigidly secured on the rod 99 are two ear members 105 and 106. Slidably mounted in the outer end portions of these two ears is a headed pin 107. This pin 107 is capable of having its forward end engage either side of the arm 104. It is yieldingly held in a forward position by the coil spring 108, which has one end operatively engaging the pin and its other end engaging the ear 106.

Figure 17:
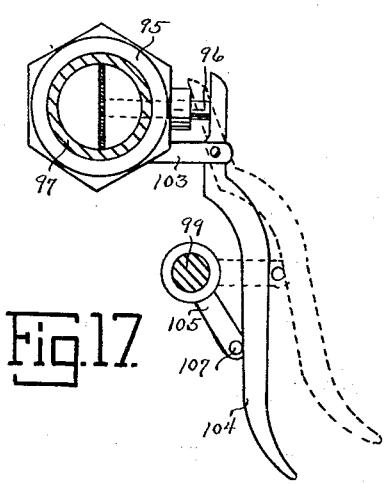
Fig. 17 is an enlarged front end view of the self-closing water valve and control mechanism.
Figure 18:
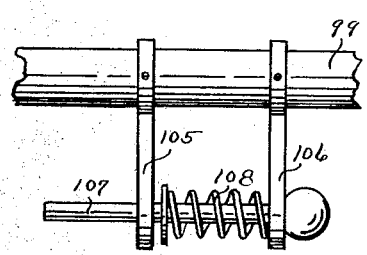
Fig. 18 is an enlarged side view of a portion of the mechanism used in actuating the valve shown in Fig. 17.
Figure 20:
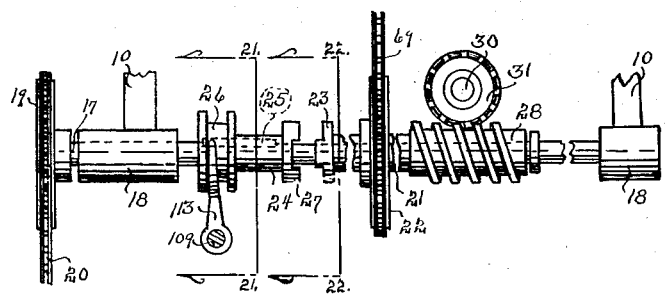
Fig. 20 is a rear view of a portion of the mechanism for operatively connecting the device to the prime mover.

When the forward end of the pin 107 is at the inner side of the arm 104 and the lever 100 is raised outwardly and upwardly, the rod 99 will be rotated and the pin will engage the under side of the arm 104 and move that member outwardly, as shown in dotted lines in Fig. 17, thereby moving the stem 96 inwardly and opening the valve 95. The numeral 109 designates a rod rotatably mounted in the frame 10 and extending below the shaft 17. On the forward end of this rod is a projecting arm 110. The numeral 111 designates a similar arm rigidly secured to the rear end of the rod 99 and directly above the arm 110. The numeral 112 designates a link connecting the outer ends of the arms 110 and 111. The numeral 113 designates a fork member rigidly secured on the rear end of the rod 109 and extending upwardly on each side and engaging the spool 26, as shown in Fig. 20.

Figure 15:
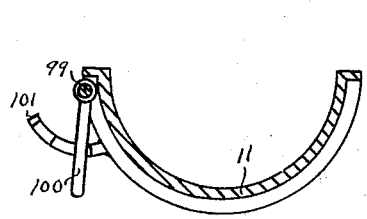
Fig. 15 is a cross sectional view of the mixing trough, taken on line 15—15 of Fig. 1.
Figure 16:
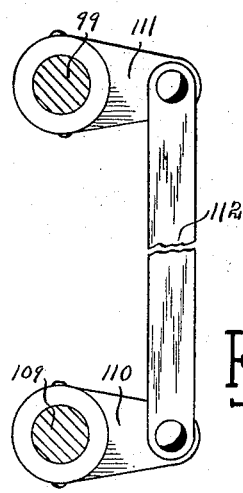
Fig. 16 is an enlarged rear end view of a link and two crank arms used in manually controlling the invention.

As we have seen, when the lever 100 was moved outwardly and upwardly, the valve 95 was opened and we now note that by the raising of the lever the upper portion of the fork 113 will thereby be moved to the right, which will force the clutch plate 27 in engagement with the clutch plate 23. By lowering the lever 100 to the lower notch in the catch member 101, as shown in Fig. 15, the valve 95 will move to a closed position and the clutch plate 27 will be moved out of engagement with the clutch plate 23. From the foregoing it will be seen that all of the principal functioning parts of the invention may be stopped or started at will, merely by the manual operation of the lever 100. If it is desired to not function the valve 95 by the rotation of the rod 99, the pin 107 should be moved to the rear and then permitted to extend again forwardly, but on the outer side of the arm 104.

With the positive manually controlled valve 91 in a suitable open condition for permitting liquid such as water to pass through it, the water or liquid will pass from the holes 98 and spray into the mixing trough 11. By rotating the shaft 34 so that the blades will first cut into the streams of liquid and then into the material in the mixing trough, the materials will be quickly and successfully mixed with the liquid, which is not so noticeable if the propeller blades move to the right and away from the streams of liquid. In the matter of mixing cement, sand, and water, this is very necessary for the obtaining of desirable results. By placing the pipe 97 some distance from the rear end portion of the trough 11, the cement and sand will be successfully mixed one with the other before the dry mixed mass reaches the water mixing zone, thereby making for better cement.

By rotating the propeller blades toward the streams of water from the distributing pipe 97, the water will not only be whipped into and through the dry material by the blades, but the blades will be washed at each revolution and kept in more or less a clean condition.

In the matter of mixing two dry materials and a liquid with my invention the desired proportioned amounts may be easily and accurately obtained by the use of the handle 73 and the adjusting wheel 93 of the valve 91.

Although I have described my invention as particularly adapted to the mixing and making of cement, it may be used to equal advantage for the mixing of other materials.

One of the advantages of my machine is that the material will be uniformly and successfully mixed regardless of the speed of rotation of the propeller blades. This means that production may be speeded up without affecting the successful mixing of the material and is distinguished from batch mixers whose efficiency is impaired by increasing the rotation of the mixing drum beyond certain limits. The reason for this is that with batch mixers the material has a tendency to remain stationary by centrifugal forces.

Some changes may be made in the construction and arrangement of my improved material mixing machine, without departing from the real spirit and purpose of my invention, and it is my intention to cover by my claims any modified forms of structure or use of mechanical equivalents which may be reasonably included within their scope.

I claim:

1. In a device of the class described, a frame, a horizontal mixing trough open at its top and end, a shaft rotatably mounted in said trough, agitating members secured to said shaft, a liquid ejecting pipe above said trough, a manually adjustable valve in communication with said pipe, a self-closing valve in communication with said pipe, a hopper, an endless rotatably mounted chain leading from said hopper to a point above said trough, buckets on said chain, a prime mover, a clutch for operatively connecting said prime mover to said chain, and a control lever for simultaneously operating said cultch and said self-closing valve.

2. In a device of the class described, a frame, a horizontal mixing trough open at its top and end, a shaft rotatably mounted in said trough, agitating members secured to said shaft, a liquid ejecting pipe communicating with the inside of said trough, a manually adjustable valve in communication with said pipe, a self-closing valve in communication with said pipe, a hopper, an endless rotatably mounted chain leading from said hopper to a point above said trough, buckets on said chain, a prime mover, a clutch for operatively connecting said prime mover to said chain, and a manually operated control lever positioned at the forward end of said mixing trough for simultaneously operating said clutch and said self-closing valve.

3. In a device of the class described, a frame, a horizontal mixing trough open at its top and end, a shaft rotatably mounted in said trough, agitating members secured to said shaft, a liquid ejecting pipe at the side of said trough, a manually adjustable valve in communication with said pipe, a self-closing valve in communication with said pipe, a hopper, an endless rotatably mounted chain leading from said hopper to a point above said trough, buckets on said chain, a prime mover, a clutch for operatively connecting said prime mover to said chain, a manually operated control lever positioned at the forward end of said mixing trough for simultaneously operating said clutch and said self-closing valve, and adjustable gates in said hopper.

4. In a device of the class described, a frame, a horizontal mixing trough, a shaft rotatably mounted in said trough, agitating members secured to said shaft, a liquid ejecting pipe over said trough, a self-closing valve in communication with said pipe, a hopper, an endless rotatably mounted chain leading from said hopper to a point above said trough, buckets on said chain, a prime mover, a clutch for operatively connecting said prime mover with said chain, and a control lever for simultaneously operating said clutch and said self-closing valve.

5. In a device of the class described, a frame, a horizontal mixing trough, a shaft rotatably mounted in said trough, agitating blades on said shaft, a pipe at the marginal edge of said trough having a plurality of openings, a second pipe designed to have one end communicating with a source of liquid supply and its other end communicating with said first mentioned pipe, a manually operated valve interimposed between said two pipes, a scale reading on said valve, a second valve in communication with said second pipe, a means for introducing material into said trough, a prime mover, a clutch for operatively connecting said prime mover with said means for introducing material into said trough, and a single control lever for operating said clutch and said second-mentioned valve.

ARTHUR W. ALLEN.